United States Patent [19]

Bauerschmidt et al.

[11] Patent Number: 6,081,729
[45] Date of Patent: Jun. 27, 2000

[54] ENCAPSULATED TUBULAR CONDUCTOR

[75] Inventors: Peter Bauerschmidt, Schwabach;
Ottmar Beierl, Aurachtal; Gerd Scholl,
München; Oliver Sczesny, Aschheim;
Wolf-Eckhart Bulst; Valentin Magori,
both of München; Thomas Ostertag,
Finsing; Leonhard Reindl,
Stephanskirchen; Dieter Lorenz, Berlin,
all of Germany

[73] Assignee: Siemens Aktiengesellschaft, Munich,
Germany

[21] Appl. No.: 09/127,528

[22] Filed: Jul. 31, 1998

Related U.S. Application Data

[63] Continuation of application No. PCT/DE97/00090, Jan. 20, 1997.

[30] Foreign Application Priority Data

Jan. 31, 1996 [DE] Germany .................... 196 03 463

[51] Int. Cl.$^7$ ............................................. H04B 7/00
[52] U.S. Cl. ............... 455/523; 340/870.03; 340/870.11; 340/635; 361/96; 324/522; 455/14; 455/41
[58] Field of Search ............ 340/870.03, 870.11, 340/635; 324/127, 522, 512, 531, 771; 702/57, 59, 62; 250/227.11; 361/96; 455/14, 41, 523

[56] References Cited

U.S. PATENT DOCUMENTS

| | | | |
|---|---|---|---|
| 4,345,471 | 8/1982 | Endo et al. | 374/188 |
| 4,369,364 | 1/1983 | Kuntermann | 250/227.11 |
| 4,719,415 | 1/1988 | Mehnert | 324/96 |
| 4,796,027 | 1/1989 | Smith-Vaniz | 340/870.03 |
| 5,029,101 | 7/1991 | Fernandes | 702/62 |
| 5,170,050 | 12/1992 | Giboulet et al. | 250/227.11 |
| 5,608,328 | 3/1997 | Sanderson | 324/529 |
| 5,656,931 | 8/1997 | Lau et al. | 324/522 |
| 5,859,590 | 1/1999 | Otani | 340/635 |

*Primary Examiner*—Fan Tsang
*Assistant Examiner*—Isaak R. Jama
*Attorney, Agent, or Firm*—Herbert L. Lerner; Laurence A. Greenberg; Werner H. Stemer

[57] ABSTRACT

An encapsulated tubular conductor having at least two antenna elements disposed on the capsule thereof for maintaining therebetween wireless information transmission in a transmitting-receiving direction, and a transmitting-receiving device located outside the capsule and assigned to one of the antenna elements includes another transmitting/receiving device also disposed outside the capsule and assigned to the other of the antenna elements, the antenna elements being directed towards an interior space of the capsule, the interior space serving as a transfer path via which information is transferable between the transmitting-receiving devices.

12 Claims, 4 Drawing Sheets

ENCAPSULATED TUBULAR CONDUCTOR

CROSS-REFERENCE TO RELATED APPLICATION

This is a continuation of copending International Application PCT/DE97/00090, filed Jan. 20, 1997, which designated the United States.

BACKGROUND OF THE INVENTION

Field of the Invention

The invention relates to an encapsulated tubular conductor having at least two antenna elements disposed on the capsule for maintaining therebetween wireless information transmission in a transmitting-receiving direction, and a transmitting-receiving device located outside the capsule and being assigned to one of the antenna elements.

German Utility Model 94 20 199 discloses a metal-encapsulated high-voltage switching installation in which a surface acoustic wave element (SAW) is arranged in one of the gas regions thereof. The SAW is used for verifying gas constituents which are produced by the effect of arcing on the extinguishing gas which is contained in the encapsulation, or for detecting pressure waves. In this regard, an antenna, which is used for wireless information transmission to an evaluation device, is arranged on the outside of the encapsulation. The published German Patent Document DE 195 14 342 C1 discloses the use of SAW sensors in a high-voltage cable.

The use of SAW sensors in high-voltage technology is disclosed in principle in the article "Akustische Oberflächenwellen-Technologie für Innovationen" [Surface acoustic wave technology for innovations] from Siemens-Zeitschrift Spezial (Siemens Journal, Special] FuE, Spring 1994. It has also already been provided in this case for the SAW sensor to be mounted in the container and for its antenna to be mounted externally.

For information transmission in high-voltage cables it is known, for example, for information to be transmitted via telecontrol cables or telephone lines. It is also known for the information which is to be transmitted to be input onto the high-voltage cable itself.

The European Patent Document EP-A-0 621 489 discloses a device for registering partial loads in a tubular conductor. For doing so, a registering device with antenna elements is provided inside the tubular conductor. It transmits information to another antenna element directed towards the interior which is connected with a processing device arranged outside of the tubular conductor. The arrangement described in this published document primarily serves for wireless interference value determination, transmission of information being provided for only in the message direction.

SUMMARY OF THE INVENTION

It is accordingly an object of the invention to provide an encapsulated tubular conductor offering a relatively simple improvement over encapsulated tubular conductors for electrical power which have become known heretofore, in that the number of transmission cables that are to be used is minimized.

With the foregoing and other objects in view, there is provided, in accordance with the invention, an encapsulated tubular conductor having at least two antenna elements disposed on the capsule thereof for maintaining therebetween wireless information transmission in a transmitting-receiving direction, and a transmitting-receiving device located outside the capsule and assigned to one of the antenna elements, comprising another transmitting/receiving device also disposed outside the capsule and assigned to the other of the antenna elements, the antenna elements being directed towards an interior space of the capsule, the interior space serving as a transfer path via which information is transferable between the transmitting-receiving devices.

In accordance with another feature of the invention, the transmitting/receiving devices are operative with waves selected from the group thereof consisting of acoustic, optical and electromagnetic waves.

In accordance with a further feature of the invention, the interior space of the capsule is subdivided into a plurality of subspaces, and the antenna elements are disposed in different subspaces of the interior space.

In accordance with an added feature of the invention, the antenna elements are disposed at respective openings formed in the capsule and assigned thereto.

In accordance with an additional feature of the invention, the antenna elements are disposed within the interior space of the capsule.

In accordance with an alternative feature of the invention, the antenna elements are disposed outside the interior space of the capsule.

In accordance with yet another feature of the invention, the encapsulated tubular conductor includes at least one sensor disposed in the interior space, the sensor being remotely interrogatable by at least one of the antenna elements.

In accordance with yet a further feature of the invention, at least one of the transmitting/receiving devices has an interface for coupling a monitoring device at least at an equivalent level thereto.

In accordance with yet an added feature of the invention, the capsule is metallic.

In accordance with yet an additional feature of the invention, the encapsulated tubular conductor includes at least one switching device disposed inside the capsule.

In accordance with another feature of the invention, the encapsulated tubular conductor includes a conductor for a voltage selected from the group thereof consisting of high and middle voltages disposed within the capsule.

In accordance with a concomitant feature of the invention, the at least one sensor is constructed as a surface acoustic wave sensor.

The information transmission can be performed by acoustic, optical or, preferably, electromagnetic waves. Any desired choice of the technology used is thus possible, which is in each case oriented to the respective conditions of the tubular conductor.

The interior space of the tubular conductor is subdividable into a plurality of subspaces, the antenna elements being arranged in different ones of the subspaces. In this manner, it is possible to transmit information even over long distances. If necessary, a signal amplifier can be provided in a subspace between the antenna elements in order to amplify a signal level over long distances. For this purpose, the signal amplifier may have two antennas which are preferably isolated from one another by at least one partition or compartment wall.

The antenna elements are respectively disposed at an assigned opening on the capsule. This provides a simple accommodation, which is suitable for existing and new installations. The antenna elements can optionally or selectively be disposed advantageously inside or outside the interior of the capsule.

In addition, at least one sensor, which can be interrogated remotely at least by one of the antenna elements, can be arranged in the interior. This provides a favorable combination of information transmission and monitoring in the tubular conductor in a relatively simple manner.

At least one of the transmitting/receiving devices may have an interface to which there may be coupled a monitoring device which is at an equivalent or higher level. Extensive information interchange with widely different systems is thus possible.

The capsule is preferably metallic, as a result of which good screening is provided. At least one switching device or a conductor for high or medium voltage can be arranged in the capsule. An incorporation thereof into a wide range of tubular conductor systems, for example a switching installation, is thereby possible.

The sensors are preferably constructed as surface acoustic wave sensors, which results in a space-saving accommodation thereof in the tubular conductor.

Furthermore, an encapsulated installation for electrical power having a plurality of sensors, which are arranged with the antenna elements thereof in the interior of the capsule, is provided, a monitoring device having an antenna element for information interchange with the sensors being also provided, the antenna element of the monitoring device being arranged on the capsule and being directed towards the interior, and the sensors being selectively interrogatable.

This construction makes it possible to monitor a large number of functions by remote interrogation using simple elements, without having to incur any wiring or mechanical outlay inside the capsule. Only the desired sensors need be fitted. This solution is also suitable for existing installations and can easily be extended, it being possible to accommodate the sensors in the capsule of the installation, even in unfavorable spatial conditions.

The sensors are preferably constructed as surface acoustic wave sensors (SAW). These sensors have a small physical size and high reliability. This makes possible the accommodation thereof in the interior of the capsule in a manner which is favorable in service, a high level of safety in operation being provided. In one embodiment, the size of the sensors may be roughly that of a credit card, a major part thereof advantageously being used as an antenna element.

At least some of the sensors may be constructed to detect different measurement variables, as a result of which it is possible to detect a multiplicity of different information items and/or measurements. The sensors can, in this regard, be arranged in different subspaces, in particular gas spaces, in the installation. This applies, of course, only to the extent that information transmission is possible between two subspaces through the partitions thereof.

The sensors may be constructed as active or, preferably, as passive components. In this manner, account can be taken of the respective conditions at the respective installation locations. A passive construction has the advantage that no electronics at all need be used. This is favorable for use at high voltages.

The sensors can advantageously be arranged in the capsule at the potential of the capsule or at the potential of a conductor. This does not result in any limitation to specific detection values, potential conditions or installation locations. The installation location may even be movable (for example on a switching rod). No additional potential isolation members are necessary.

The monitoring device advantageously has at least one additional interface for information interchange with other sensors, SAWs, measurement sensors or detection devices. Overall incorporation of other information sources, even outside the capsule, is thus possible, which results in a multi-sensor concept.

The further interface or interfaces can be constructed as a cable-based interface or interfaces, in particular an electrical, acoustic or optical interface or interfaces, or as a wireless interface, as a result of which it is possible to couple a wide range of information sources thereto.

It is advantageous if an interface is provided to which there is couplable a monitoring device, which is at an equivalent or higher level. The interface can then preferably be formed as a bus interface, as a result of which a high data transmission rate is possible.

Coding is preferably provided for selective interrogation. In this way, it is possible to distinguish between the respective information items and assign them the respective sources or sensors. The coding can be implemented by hardware or by a procedural measure, for example software. In this regard, for the coding, different frequencies may be assigned to the respective sensors for information transmission. Each sensor thus has its own information path or channel.

The coding can alternatively or additionally be carried out in conjunction with a frequency or time division multiplex method. This enables favorable, multiple use of existing frequency channels.

According to a further alternative, the coding can be performed by polarization, for example, of the electromagnetic wave used, possibly using a directional antenna, or by correlation. This type of coding is favorable for use in metal encapsulation. Correlation methods are known in principle from radar technology, a signal pattern being transmitted back with a response signal of the sensor, the signal pattern being identified in the monitoring device by a signal comparison method, for example a correlation method.

The coding can also be performed by an identification in the transmission or response signal during the information interchange. This results in a selective identification capability in the transmitting and receiving device in each case.

The capsule may be metallic, resulting in a preferred use of the installation for high or medium voltage. The wide range of information items which occur there can thus be processed safely and easily. This also provides internal and external screening. At least one switching device or a conductor is then arranged inside the capsule. The installation is thus then constructed as a switching installation or tubular conductor.

The antenna elements can optionally be constructed for the transmission of optical, acoustic or electromagnetic waves, an embodiment resulting therefrom which is optimized for high transmission reliability and high interference immunity with a maximum possible transmission rate, depending upon the application. The invention is particularly simple and can be integrated into new and existing installations without any problems. The antenna elements are installable without any complex measures.

Comprehensive monitoring of a switching installation, of a tubular conductor or of an encapsulated component is possible in this manner, it being further possible to interrogate remotely and selectively a multiplicity of sensors, in particular SAWs, via one antenna element. The monitoring can, in this regard, be accurate with respect to the gas space, considerable savings in cost and complexity being achieved, particularly in the case of large gas-insulated switching installations, in comparison with cable-based monitoring.

The term "encapsulated installation" in this context in general means installation parts for electrical power distribution, in particular for high or medium voltage, which have encapsulation, namely a capsule, housing or tank wherein at least one electrical component is accommodated. Examples of this are: an encapsulated switch disconnector or circuit breaker, an encapsulated switching mechanism, an SF6-insulated transformer or an SF6 tubular conductor.

Other features which are considered as characteristic for the invention are set forth in the appended claims.

Although the invention is illustrated and described herein as embodied in an encapsulated tubular conductor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
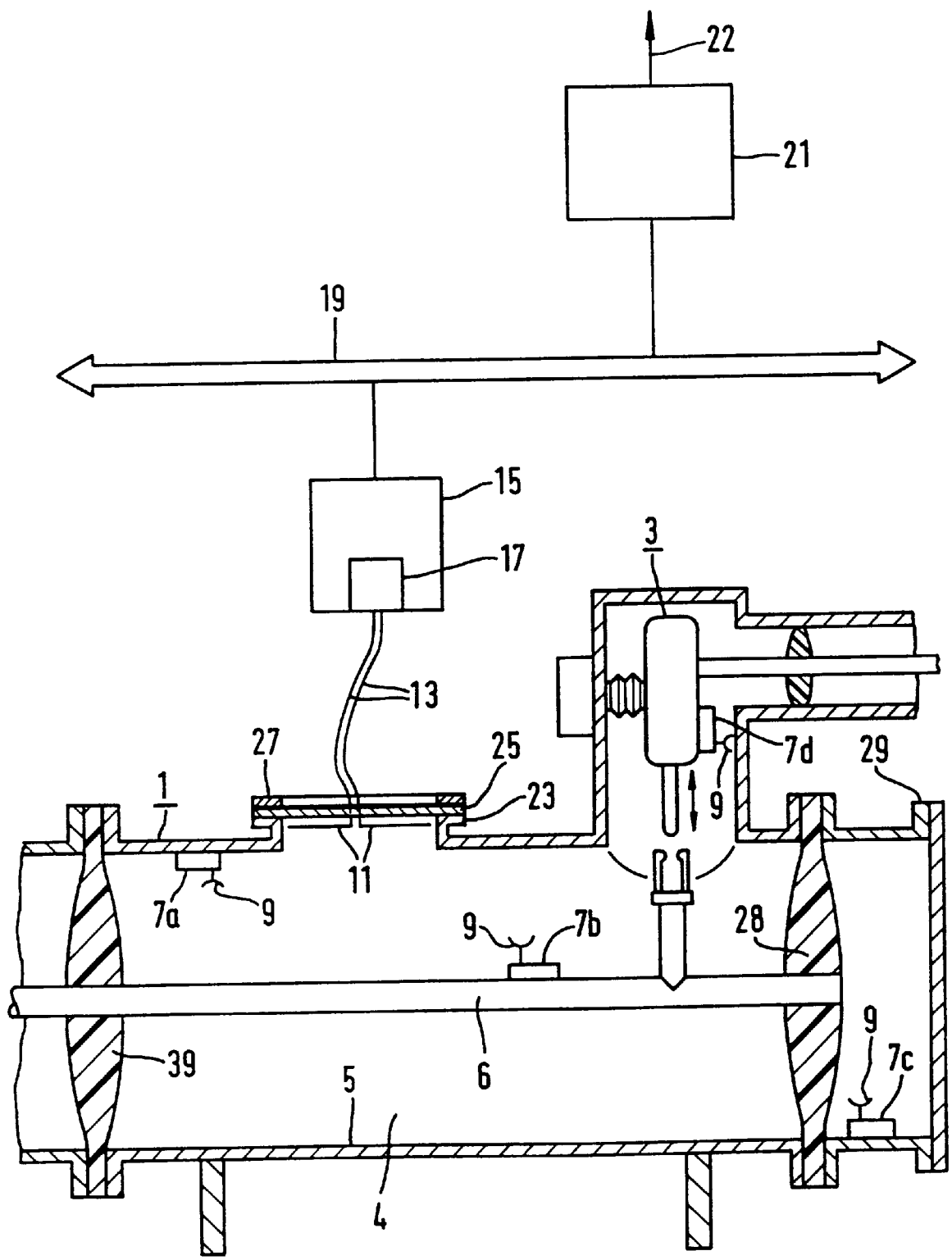
FIG. 1 is a longitudinally sectional, diagrammatic and schematic view of a first embodiment of a switching installation having SAWs.

Referring now to the drawings and, first, particularly to FIG. 1 thereof, there is shown therein and described initially in general hereinafter a switching installation having a monitoring device wherein information is transmitted at radio frequency. It is self-evident that the described monitoring device can also be used for other functions within the switching installation, for example, for detecting a switch position without sensors by using a radar principle, for additional control tasks, or purely for information transmission.

FIG. 1 shows an encapsulated, gas-insulated switching installation 1, of the type disclosed, for example, in the prior art according to the aforementioned German Utility Model 94 20 199. The switching installation 1 is suitable for very high, high or medium voltage. A switching installation, in this context, also means an encapsulated tubular conductor without a switching element.

In this longitudinal sectional view of part of the switchgear assembly 1, there is shown a branch with a switching device 3, such as a disconnector or an interrupter unit, in particular. A busbar 6, such as an electrical conductor, extends centrally to the cladding or encapsulation 5. Reference may be made to the aforementioned German Utility Model for further details regarding the switching device 3 and the function thereof. Surface acoustic wave sensors (SAW) for widely different tasks are arranged in the interior space 4 of the capsule or casing 5 of the switchgear assembly 1, such as, for example, a SAW 7a for temperature detection, a SAW 7b for current detection, a SAW 7c for gas identification and a SAW 7d for position identification. Further SAWs for other functions or tasks, such as light identification, pressure measurements, and so forth, for example, are also conceivable, in this regard.

As receiving and transmitting members, each SAW has at least one antenna 9 for information transmission, in particular, for interrogation. The information transmission, in this regard, takes place from the SAWs 7a to 7d to a central transmitting and receiving antenna, which acts for all the SAWs 7a to 7d and is referred to as the antenna element 11 hereinafter.

The terms antenna, transmitting and receiving antenna, antenna element or receiving and transmitting members or means, as used herein, are meant to be any radiating and receiving elements which allow emission and/or reception of electromagnetic or optical waves, for example radio antennas, ultrasound or optical transmitting and receiving elements (for example infrared elements), and encompass, as well, a split or division in the transmitting and receiving direction. In principle, an acoustic information transmission with correspondingly constructed radiating and receiving devices are conceivable. By way of example, the embodiment according to FIG. 1 of the drawing relates to radio information transmission.

The antenna element 11 is connected to a control and monitoring device (referred to hereinafter as the monitoring device 15) via suitable lines 13, for example, a coaxial cable, if necessary or desirable, with a matching element connected in-between. This monitoring device 15 includes a transmitting and receiving section 17 and a further device for signal evaluation, which is otherwise not illustrated in any greater detail, and for which purpose a processor with a memory device may possibly be provided.

The transmitting and receiving section 17, or at least parts thereof, can in principle also be arranged decentralized in the case of the antenna element 11, so that only low-power data traffic takes place between the monitoring device 15 and the antenna element 11. The transmitted power is then produced decentralized.

It is also conceivable for the antenna element 11 to be connected by cable to a decentralized device, or wirelessly directly to a bus 19. The monitoring device 15 together with the transmitting and receiving section 17 and the connected antenna element 11 may also be referred to as a transmitting/receiving device or transceiver for the purposes of the concept at hand.

The monitoring device 15 may, for example, be a central unit in a switchgear assembly or else a device which is related to a branch or piece of equipment and connected for data purposes to a superordinate control center 21 via a further data link, for example, the bus 19. This control center 21 may be a local control center which is, in turn, connected to a superordinate network control center via a suitable interface 22.

Of course, at least the control center 21 includes suitable control and display devices, such as a keyboard and a screen or monitor, for example, for operating the switchgear assembly 1. A portable unit, for example, an otherwise non-illustrated portable computer or a laptop, can also be connected via suitable interfaces to various points in the system shown in FIG. 1 of the drawing, for example, to the bus 19 or to the monitoring device 15, for control purposes or for other inputs and outputs.

The illustrated data links may be configured as required, for example, as a cable link, in particular, a wire cable or an optical conductor, or a wireless link, for example, a radio, sound or optical link.

In the embodiment of the invention presented herein, the antenna element 11 is arranged in an opening within the capsule 5. The opening in the illustrated embodiment is defined by a flange 23, which is closed by a closure element 25, for example, a cover and a pressure gasket 27. Screw units, which are otherwise not shown in detail herein, may also, of course, be provided for the flange joint in accordance with the prior art.

The antenna element 11 is thus located within the capsule 5, thereby providing ideal conditions for problem-free information transmission to the SAWs 7a to 7d. Because the antenna element 11 is located virtually within a connecting stub and does not project into the interior space 4, electrical or technical field problems are avoided here. Furthermore, the antenna element 11 and a component which is in any case detachable from the capsule or casing 5 form a structural unit, so that it is readily accessible or else can be retrofitted.

Some of the SAWs 7a to 7d are, in this regard, arranged on the capsule 5, some on the busbar 6, and some on a moving part of the switching device 3 or else on or behind a first insulator 28, possibly in a separate gas chamber. A plurality of sensors for different functions may possibly be arranged jointly at one location and have a common antenna. It is also possible for one sensor to have a plurality of measurement functions. The sensors may advantageously have an areal or substantially two-dimensional construction with a size of about 5 to 100 cm$^2$, the major part thereof forming the antenna element.

An essential feature for the operation of the overall monitoring system is that a reliable radio or data link exists within the capsule 5. To this end, a supporter or insulator 28 is formed of a dielectric material so that there is also no adverse effect on radio-frequency transmission between the antenna element 11 and the SAW 7c located behind the supporting insulator 28. In the case of other transmission methods, the supporter 28 must be formed of an appropriate material, such as glass for optical transmission, for example.

The flange 23 or the opening required for injection may be, for example, part of an existing maintenance opening of a gas filling connecting stub, a casting resin filling opening, an inspection hole or an end flange. The configurations described by way of example herein may thus be used for this purpose for any possible openings on switchgear assemblies, for example, for the illustrated end flange 29, as well. A specially provided opening may also be used.

It is also conceivable for the antenna element 11 to be arranged outside the capsule 5 and to radiate into the interior space 4 via a dielectric window. In this case, the opening may be, for example, a filling connecting stub formed in the region of a connecting flange for two cladding sections, in which case the antenna element, which may be formed as a rod antenna, is cast in the opening.

If an otherwise non-illustrated further antenna with an associated control device is arranged in the gas chamber behind the further insulator 39, the interior 4 of the capsule 5 may also be used as a transmission space, in which case protected data transmission over long distances is possible. This option can be used preferably in the case of tubular conductors. A combination with a simultaneous sensor interrogation is conceivable.

The concept according to the invention relates essentially to the selective detection of the measurements, variables or information detected by the respective sensors, in particular the SAWs 7a to 7d. In this arrangement, it is possible to distinguish first of all between whether the SAWs are or are not called up selectively.

Selective call-up can take place, for example, by different frequencies (or channels). In this case, a separate transmission channel would virtually be reserved for each SAW, the call-up signal at the central-computer end and the response signal at the SAW end, respectively, being located on the same transmission channel.

A further option is that of a coding, identification or other selection signal being transmitted with a call-up signal which can be received by all the SAWs, the selection signal being identified in the respective SAW to be activated, which then emits a response signal containing the corresponding information. It is thus possible for only the respectively addressed SAW (or the SAW group) to respond.

It is furthermore possible for all the SAWs 7a to 7d to be activated by the antenna element 11 using a common call-up signal, the selection being made subsequently, after reception by the antenna element 11. This can be done, for example, by the call-up signal being used to request the selected SAW to insert an identification, for example a pulse or a signal pattern, in its response signal. The signal mixture emitted jointly by all the SAWs is then analyzed to find the identification, as a result of which the corresponding response signal can be filtered out and selected in the monitoring device 15. A correlation method can be used here, for example.

Particularly simple selection can be achieved if the SAWs 7a to 7d emit response signals at different frequencies, which response signals are received purely by different receiving antennas, which are formed by the common antenna element 11 of the monitoring device 15, and are passed on for respectively separate reception evaluation in the transmitting and receiving section 17. The important feature in this case is that only one common gland, or a common opening, is required to the antenna element 11.

All the SAWs 7a to 7d are thus called up by an antenna element 11, the respective response signals being selected by a receiving antenna which is matched or set appropriately to the signal frequency of the response signal of the respective SAW. In consequence, there is no need for any complex selection inside the monitoring device 15. The respective receiving antennas car then, possibly, also be connected to the common monitoring device 15, for example by means of a multiplexing or changeover method.

Another option is to use a time division multiplex method. The SAWs 7a to 7d called up in this case emit their response signal, staggered successively in time, at the same frequency. The selection is then carried out in the monitoring device 15 just by selection of the response signal of the respective SAW 7a to 7d which is located in a time window.

A further conceivable option is for the respective SAWs 7a to 7d to emit a differently polarized response signal, by means of which it is possible to distinguish between the respective response signals. Distinguishing between the polarized electromagnetic waves could then be carried out by a plurality of antennas or by an adjustable antenna element 11. The use of this technique is conceivable particularly for the limited propagation area of the waves, namely of the encapsulation, which can be described specifically here. It is also possible for a specific SAW only or additionally to comprise distinguishing or auxiliary functions, which assist or supplement one of the selection methods indicated here.

If necessary or desirable, it is also possible to provide other selection or distinguishing methods according to the prior art, which are known, for example, by the following names: space diversity, antenna diversity, angle diversity, field component diversity or protocol interchange (secondary radar principle).

Figure 2:
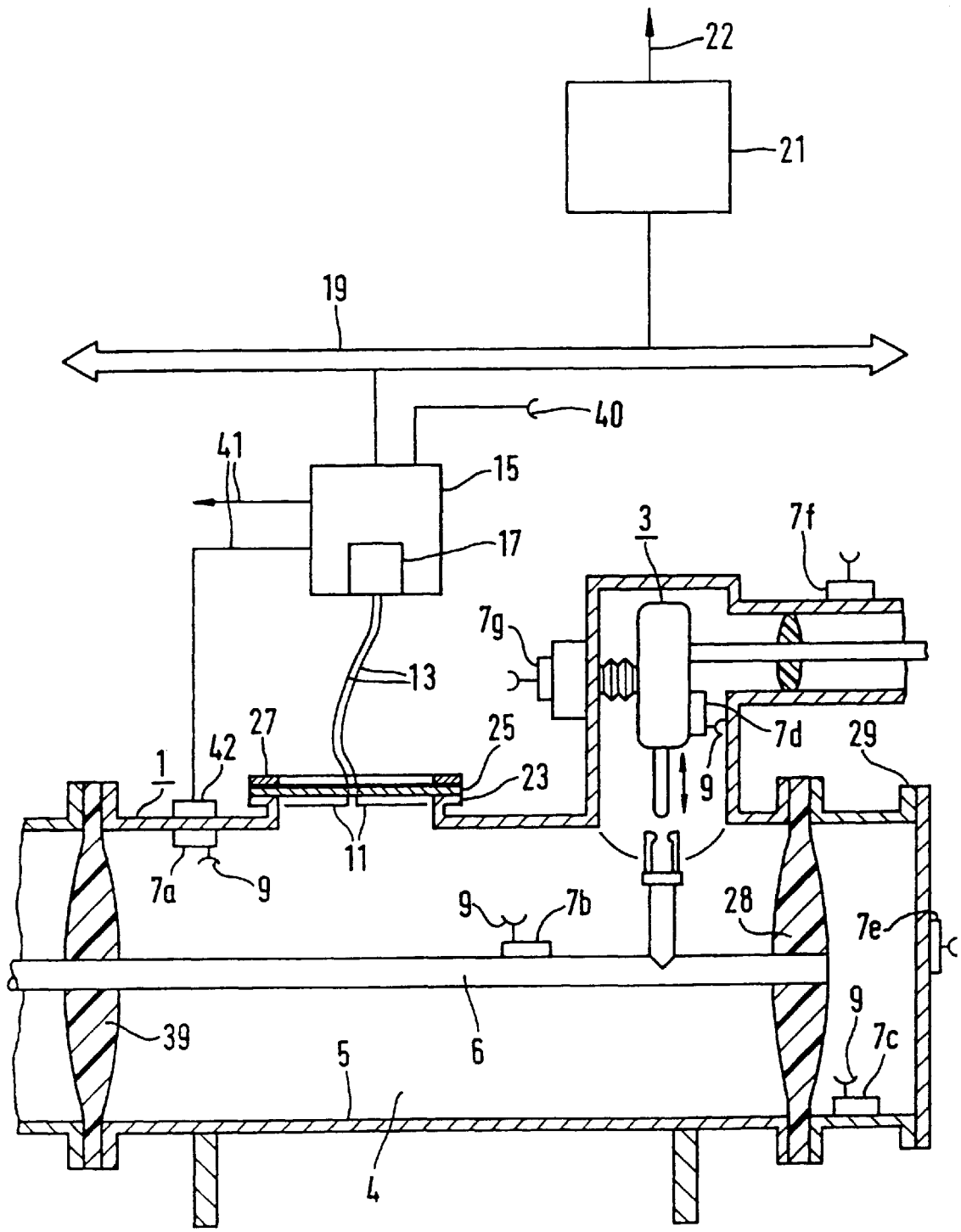
FIG. 2 is a view like that of FIG. 1 of a second embodiment of the switching installation having additional SAWs outside the capsule thereof.

FIG. 2 shows the switching installation 1 wherein, in addition to the previously illustrated SAWs 7a to 7d, additional SAWs 7e to 7g are arranged outside the capsule 5. These are constructed, for example, so as to be able to pick up an outside temperature (7e), a switching rod position (7f) or magnetic information (7g), for example, from a position encoder.

Because the antenna elements 11 of the monitoring device 15 inside the capsule 5 is subject to a screening effect, an antenna 40, which is disposed outside the capsule 5, is assigned as an additional interface to the monitoring device 15. This is specifically responsible for the SAWs 7e to 7g located outside, which can possibly also be assigned to other installation parts or equipment, for example, an open air switch or a switching linkage thereof.

The interrogation of the SAWs located outside can, of course, also be carried out by a further control and monitoring device which is otherwise not shown in detail, but which is then connected in terms of data to a common higher-level device, for example, the central computer 21. Other interfaces 41 are optionally also possible, via which other sensor devices may be connected, such as, for example, protection devices, optical current and voltage converters or similar sensors configured as mentioned hereinbefore, but which are cable based, in contrast to those described above. The sensor 42 is an example thereof. In this regard, it is possible to use wire cables or optical cables, by way of example, as transmission lines.

Figure 3:
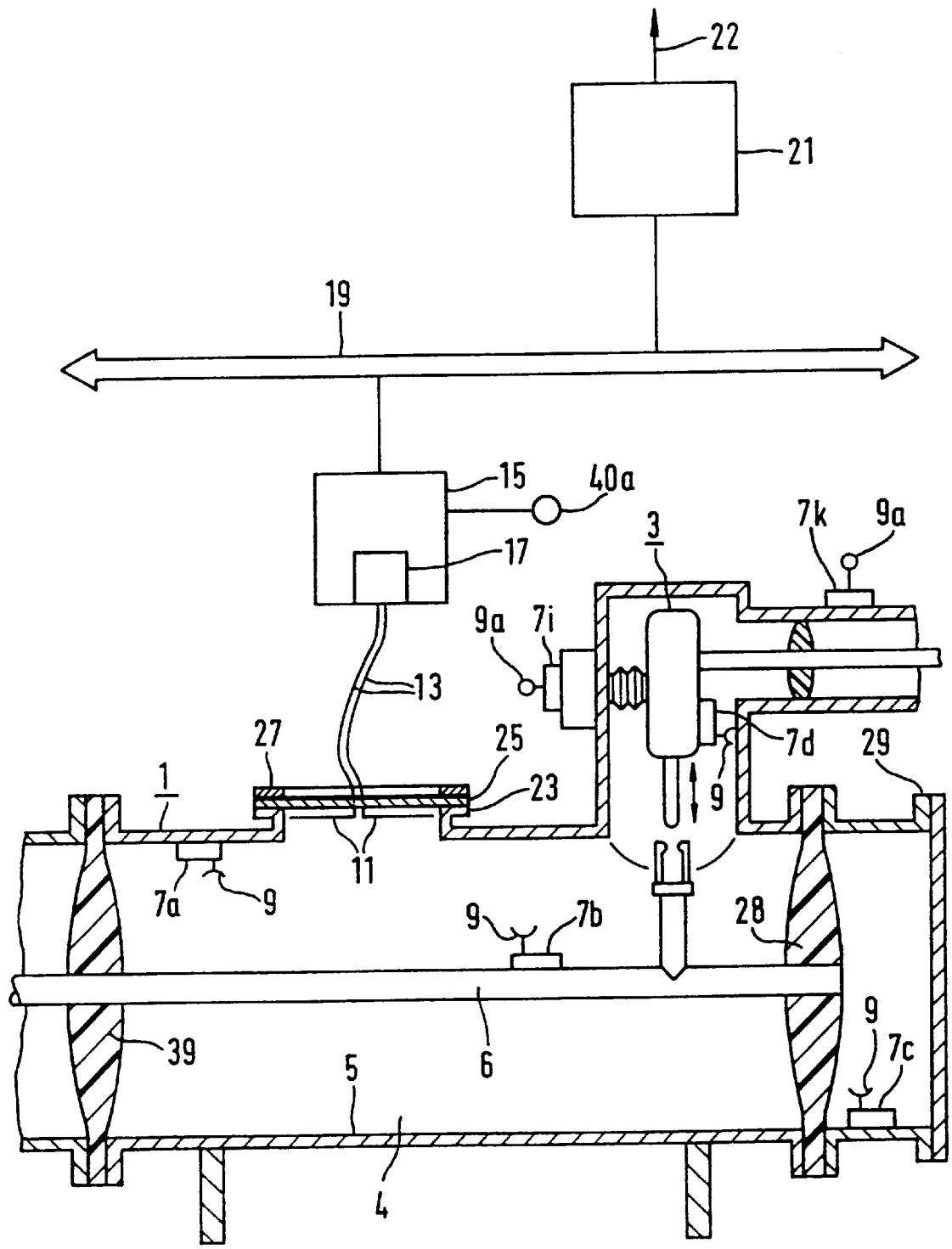
FIG. 3 is a view like that of FIGS. 1 and 2 of a third embodiment of the switching installation wherein optical information transmission is utilized.

FIG. 3 shows a further embodiment of the invention, wherein the information transmission between the monitoring device 15 and the SAWs 7i and 7k located outside takes place optically. The monitoring device 15 has an infrared transmitting and receiving element 40a as the antenna element for this purpose. The antenna elements 9a of the SAWs 7i and 7k are accordingly constructed as infrared devices.

This type of information transmission can, of course, also be applied to the information transmission within the switching installation 1 inside a closed gas space. The embodiment according to FIG. 3 can, of course, also be constructed in principle with acoustic information transmission, for example, in the ultrasonic band.

The SAWs 7a to 7k may each be constructed as an active or else as a passive component. If constructed as an active component, an additional power supply is required. This may be provided, for example, by an energy storage, in particular a battery, by a power source which is present on site, or by additional power transmission. This transmission is preferably produced by the call-up signal which is transmitted by the antenna element 11 and also transfers the corresponding power. However, it is also conceivable for the additional energy to be transferred in other ways, for example, via optical conductors or on radio or optotechnical paths. If required, it is also possible to receive power at the installation location of the SAW.

The described sensors can be arranged preferably in spaces within the installation which are free of any fields or where the fields are reduced. Interference sensitivity is thus reduced. In this case, the sensors are accommodated at a location which is suitable for the respective measurement variable and which may possibly be produced by the forming operation or shaping of the capsule 5 or of fittings thereof.

Figure 4:
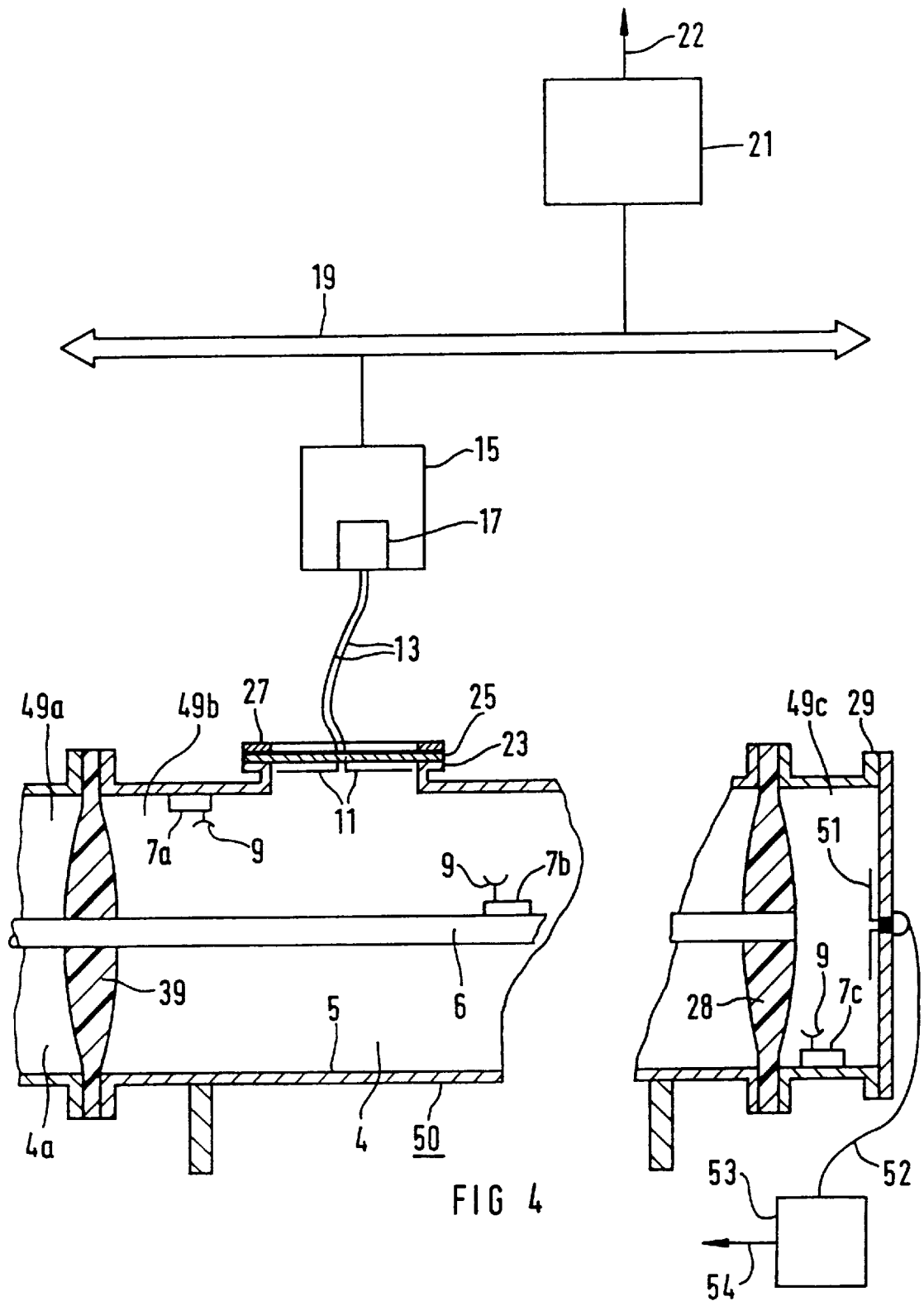
FIG. 4 is a view like that of FIGS. 1 to 3 of a tubular conductor according to the invention which has a device for information transmission.

FIG. 4 shows a tubular conductor 50 which is suitable for the transmission of electrical power, for example, for very high, high or medium voltage. If necessary or desirable, the tubular conductor 50 may possibly also have switching devices or other electrical components in the interior of the capsule 5 thereof, corresponding to the constructions previously described hereinabove.

The tubular conductor 50 of FIG. 4 may be, for example, an SF6 tubular conductor which is intended to enable power transmission over relatively long distances, in particular several kilometers. The tubular conductor 50 which is shown is in this regard drawn broken away in order to symbolize the lengthy extent thereof. The interior space 4 of the tubular conductor 50 is, in this regard, used for information transmission. For this purpose, the tubular conductor 50 is provided with the antenna element 11 in a manner analogous to the previously described configuration, and this antenna element 11 is directed towards the interior 4 of the tubular conductor 50.

The interior space 4 is, in this regard, subdivided into subareas 49a, 49b and 49c, which are formed by partitioning or insulated supports 28 and 39. A further antenna element 51 is arranged, virtually as a counter-station, in a subspace 49c. A transmitting and receiving device 53 is assigned to this antenna element 51, via a connecting cable 52. The transmitting and receiving device 53 is constructed, in principle, like the monitoring device 15.

Information transmission then takes place between the two antenna elements 11 and 51. This transmission can be used for a very wide range of tasks, for example, for control tasks, protection signal transmissions or voice signal transmissions. In addition, an information interchange can possibly also take place using the SAWs 7a to 7c. The respective items of information in the information transmission are, in principle, distinguished in accordance with the methods described hereinabove.

The information transmission can, in this regard, take place by the use of acoustic, optical or electromagnetic waves. The selection of the respective type of transmission is dependent upon the given circumstances, for example, based upon the extent to which the transmission path, which is interrupted by the insulated supports 39 and 28, is suitable for the respective type of transmission.

The antenna elements 11 and 51 are preferably arranged at a respective assigned opening, the respective connecting cables thereof extending out through suitable pass-throughs. The antenna elements 11 and 51 may optionally and selectively be disposed within or outside the interior space 4.

The transmitting and receiving device 53 can, of course, include other interfaces 54 for the purposes of the interfaces described hereinabove.

What is essential for this construction is that no other transmission paths parallel to the tubular conductor 50 are required for information transmission. The interior of the tubular conductor is used virtually as a transmission medium or channel. Consequently, the information transmission is protected against external interference and is integrated in the power transmission channel. In principle, it is also conceivable for the described technique to be applied to other pipelines, for example to pipes for gas or liquid networks.

The aforementioned individual features and embodiments of the invention herein can, of course, be combined with one another or with features from the prior art within the scope of specialist activity without departing from the basic concept of the invention.

We claim:

1. An encapsulated tubular conductor having at least two antenna elements disposed on the capsule thereof for maintaining therebetween wireless information transmission in a transmitting-receiving direction, and a transmitting-receiving device located outside the capsule and assigned to one of the antenna elements, comprising another transmitting/receiving device also disposed outside the capsule and assigned to the other of the antenna elements, the antenna elements being directed towards an interior space of the capsule, said interior space serving as a transfer path via which information is transferable between said transmitting-receiving devices.

2. The encapsulated tubular conductor according to claim 1, wherein said transmitting/receiving devices are operative with waves selected from the group thereof consisting of acoustic, optical and electromagnetic waves.

3. The encapsulated tubular conductor according to claim 1, wherein said interior space of the capsule is subdivided into a plurality of subspaces, and the antenna elements are disposed in different subspaces of said interior space.

4. The encapsulated tubular conductor according to claim 1, wherein the antenna elements are disposed at respective openings formed in the capsule and assigned thereto.

5. The encapsulated tubular conductor according to claim 1, wherein the antenna elements are disposed within said interior space of the capsule.

6. The encapsulated tubular conductor according to claim 1, wherein the antenna elements are disposed outside said interior space of the capsule.

7. The encapsulated tubular conductor according to claim 1, including at least one sensor disposed in said interior space, said sensor being remotely interrogatable by at least one of the antenna elements.

8. The encapsulated tubular conductor according to claim 1, wherein at least one of said transmitting/receiving devices has an interface for coupling a monitoring device at least at an equivalent level thereto.

9. The encapsulated tubular conductor according to claim 1, wherein the capsule is metallic.

10. The encapsulated tubular conductor according to claim 1, including at least one switching device disposed inside the capsule.

11. The encapsulated tubular conductor according to claim 1, including a conductor for a voltage selected from the group thereof consisting of high and middle voltages disposed within the capsule.

12. The encapsulated tubular conductor according to claim 7, wherein said at least one sensor is constructed as a surface acoustic wave sensor.

* * * * *